(12) United States Patent
Zhou et al.

(10) Patent No.: US 9,362,738 B2
(45) Date of Patent: Jun. 7, 2016

(54) INTELLIGENT CONTROL SYSTEM FOR HIGH-VOLTAGE SWITCH AND CONTROL METHOD THEREOF

(75) Inventors: Youdong Zhou, Zhejiang (CN); Lihui Gao, Zhejiang (CN); Zhengjia Chen, Zhejiang (CN)

(73) Assignee: NINGBO XINGBANG ELECTRIC CO., LTD., Mazhu Town, Yuyao City, Zhejiang Province (CN)

( * ) Notice: Subject to any disclaimer, the term of this patent is extended or adjusted under 35 U.S.C. 154(b) by 912 days.

(21) Appl. No.: 13/515,267

(22) PCT Filed: Aug. 23, 2010

(86) PCT No.: PCT/CN2010/076225
§ 371 (c)(1),
(2), (4) Date: Jun. 11, 2012

(87) PCT Pub. No.: WO2011/072535
PCT Pub. Date: Jun. 23, 2011

(65) Prior Publication Data
US 2012/0286587 A1    Nov. 15, 2012

(30) Foreign Application Priority Data
Dec. 17, 2009 (CN) .......................... 2009 1 0311717

(51) Int. Cl.
*H02H 7/26* (2006.01)

(52) U.S. Cl.
CPC ............. *H02H 7/263* (2013.01); *Y10T 307/747* (2015.04); *Y10T 307/865* (2015.04)

(58) Field of Classification Search
CPC .... H01H 35/00; H02H 7/263; Y10T 307/747; Y10T 307/865
See application file for complete search history.

(56) References Cited

U.S. PATENT DOCUMENTS

| | | | | |
|---|---|---|---|---|
| 3,683,362 A | * | 8/1972 | Schwanenflugel | 340/322 |
| 3,803,455 A | * | 4/1974 | Willard | 361/106 |
| 4,027,203 A | * | 5/1977 | Moran et al. | 361/98 |
| 4,131,929 A | * | 12/1978 | Moran | 361/93.5 |
| 4,674,002 A | * | 6/1987 | Li et al. | 361/66 |
| 7,187,275 B2 | * | 3/2007 | McCollough, Jr. | 340/538 |

FOREIGN PATENT DOCUMENTS

WO  PCT/CN2010/076225    12/2010

* cited by examiner

*Primary Examiner* — Zeev V Kitov
(74) *Attorney, Agent, or Firm* — Global IP Services; Tianhua Gu

(57) ABSTRACT

An intelligent control system for a high-voltage switch and a control method thereof. The control system includes a control terminal (10) and a plurality of high-voltage switches (21-1, 21-2, . . . , 21-n-1, 21-n), each of which is controlled by an executive terminal (11-1, 11-2, . . . , 11-n-1, 11-n) respectively, wherein the executive terminal is connected to the control terminal via a communication network. The executive terminal includes a current detecting module (5), an analog/digital conversion module (4), a second communication module (2), a calculation processing module (3), a first communication module (1) and a switch control module (6) which controls the switch in real-time. The current detecting module detects a line current value. The analog/digital conversion module converts the line current value into a digital current value. The first and second communication modules are for communication. The calculation processing module compares digital current values and sends an alarm signal to the control terminal, or sends a tripping order to the high-voltage switch while sending an alarm signal to the control terminal.

8 Claims, 5 Drawing Sheets

INTELLIGENT CONTROL SYSTEM FOR HIGH-VOLTAGE SWITCH AND CONTROL METHOD THEREOF

CROSS REFERENCE TO RELATED PATENT APPLICATION

The present application is the US national stage of PCT/CN2010/076225 filed on Aug. 23, 2010, which claims the priority of the Chinese patent application No. 200910311717.7 filed on Dec. 17, 2009, which application is incorporated herein by reference.

FIELD OF THE INVENTION

The invention involves a power equipment control system and the control method, especially for a intelligent control system for high-voltage switch and control method thereof.

BACKGROUND OF THE INVENTION

Considering the existing technical program of remote control high-voltage switchgear has the shortcomings like need to set up separate signal transmission line, or large amount of investment, routine maintenance, waste of resources and short distance of remote control, the inventor has applied for a patent "A Remote-controlled High-voltage Switchgear Control System and Its Method" in China to solve the problem, the patent number 200410017656.0, but there are still areas for improvement; at present, 10 kV distribution line is set up in a wide area with large dispersion, especially set up in harsh field environment, and it needs to find the failure point when there is power accident, which makes the power restoration be a complex and difficult task, even if the intelligent switchgear group in ring distribution system is provided, when one short-circuit fault of high-voltage line occurs, many high-voltage switchgear in series will trip often frequently one after another, and it needs several times of reclosing the brake before correct isolation of fault points, as for the power transfer from another power supply to the other normal regions with power outage due to failure, it is more time-consuming and laborious, especially in the failure of single-phase ground fault, it will be often difficult to fix the fault point in successive days. Therefore, a power outage caused by a fault to a large area and that sustaining for a long time will have significant impact on normal production of majorities of users;

SUMMARY OF THE INVENTION

Purpose of the invention is to provide a intelligent control system for high-voltage switch and control method thereof to overcome the shortcomings of existing technology, so as to achieve auto ground fault alarm and auto short-circuit fault isolation and alarm in a power failure accident, as well as power transfer from another power supply to other normal areas with power outage due to the fault. To this end, the invention takes the following technology solutions:

High-voltage switchgear intelligent control system includes control terminal and several high-voltage switchgears operated by executive terminals which are connected with control terminal through communication network, and their features are: the said executive terminals include current detection module, analog-digital conversion module, the second communication module, calculation processing module, the first communication module and the real-time switchgear control module; the current detection module is used for detection of circuit current data; analog-digital conversion module is set between current detection module and calculation processing module, and it is used for analog-digital conversion; the second communication module is used for communication of adjacent executive terminals when fault occurs; calculation processing module is used for real-time comparison of current data of executive terminals in adjacent, when the current data are different from each other, the said terminal will send alarm signal to control terminal or give high-voltage trip order and send alarm signal to control terminal; the first communication module is used for communication of executive terminal and control terminal. The second communication modules for adjacent executive terminals are connected in wireless or wired way. Functions like auto alarm, auto isolation and alarm of short-circuit fault point as well as power transfer to other normal regions can be achieved through comparison of current data of adjacent two or several terminals. Switchgear control module is set between high-voltage switchgear and calculation processing module, which is used for information transmission, including issuing the command to high-voltage switchgear to close or open the calculation processing module, and sending back the information of switchgear state (opening or closing) to calculation processing module.

As the further improvement and supplementation of above technical program, the invention also includes the following additional technical features:

The second communication module above said is set with HF radio auto transceiver for wireless communication connection between adjacent executive terminals.

The current detection module above said includes phase current detection unit and zero sequence current detection unit; the former is used for detection of phase current, and the later is used for detection of zero sequence current;

Phase current detection unit above said is set with three current transformers, which is connected with calculation processing module through analog-digital conversion module. Three current transformers are separately set in three-phase lines, when the current transformer detects the current is greater than the default value, it is regarded the short-circuit occurs;

Zero sequence current detection unit consists of one zero sequence current transformer and three current transformers in parallel, which are in series; and the zero current transformer is connected with calculation processing module through analog-digital conversion module. Because the three current transformers are connected with the zero sequence current transformer in series after they are connected in parallel inside, the vector sum of three-phase current is zero, if the current value detected by the zero sequence transformer is greater than the default value, it is regarded the ground fault occurs;

High-voltage switchgear intelligent control method is characterized in that the method includes:

1) Detection step: the current detection module detects the real-time current value of three-phase circuit;

2) Analog-digital conversion step: the current value detected is connected with the calculation processing module through a analog-digital conversion module;

3) Judging step: the calculation processing module judges the current value, and the second communication module dormant will be activated if the current value is greater than a certain preset number;

4) Data sending step: the current data signal is sent to the adjacent executive terminal through the second communication module that is activated, and at the same time, activates the second communication module dormant in the adjacent executive terminal;

5) Calculation processing step: the calculation processing module compares the current data of the present executive terminal with that sent from the adjacent executive terminal;

If the current values are all greater or less than the default value, it is regarded there is no difference among the values, otherwise they are different; when the current values are different, the adjacent executive terminals shall alarm to the control terminal immediately at the same time or order high-voltage switchgear trip and alarm at the same time;

The second communication module that used for communication between adjacent executive terminals are usually in dormant state, only when the real-time current at the executive terminal is greater than default value or when it receives the current information from adjacent executive terminal that greater than default value, will it be rapidly activated into working state. The real-time currents of two adjacent executive terminals or several terminals will be compared, when adjacent currents are different from each other, the section where the executive terminals are located in is just the place where the fault occurs; the control terminal will be informed through alarm or trip and alarm, so as to realize the purpose of intelligent control for automatic search, auto isolation and auto alarm.

Current detection includes zero sequence current detection and phase current detection, when zero sequence currents are different from each other through comparison, corresponding executive terminals will immediately send ground alarms to control terminal at the same time; when the two phase current data detected at adjacent executive terminals is different from each other, corresponding terminals will rapidly order high-voltage switchgear trip at the same time, and send short-circuit trip alarm to control terminal immediately. In 10 kV and 20 kV distribution system, control terminal connected with several executive terminals in series through communication network, which forms the ring distribution network, the second communication module that is activated will compare the real-time phase currents and real-time zero sequence currents of two adjacent or several executive terminals; according to the character that only when the ground fault occurs will the real-time zero current data of two or several executive terminals in adjacent before or after the fault point be different, if they are different indeed, the two adjacent or several terminals will send immediately ground alarm to the control terminal. According to the character that only when the short-circuit fault occurs will the real-time two-phase phase current data of adjacent two or several executive terminals before or after the fault point will be different, if they are different indeed, the two or several executive terminals in adjacent will trip at the same time within 150 milliseconds and automatically isolate with the short-circuit fault point, and immediately send short-circuit trip alarm to control terminal. The quick action and response as above said will improve the safety of electric circuit.

When the high-voltage switchgear trip of failure point occurs, mechanical locking and hanging of a "DO NOT OPERATE A BRAKE" warning sign shall be immediately and automatically implemented, to improve security and prevent accident;

Control terminal shall immediately order closing of interconnection switchgear so as to transfer power from the other supply to regions with power failure after it receives the information that the adjacent executive terminals occur short-circuit, trip and locking at the same time, hanging of warning signs and power failure on one side of the said interconnection switchgear of the ring line, so as to achieve the highly self-healing function of the intelligent and automatic distribution grid;

Control terminal will send an inspection signal to each executive terminal periodically and automatically, to check their operations and force those interrupted for any reason to be activated until self-heal. When the executive terminal feedbacks the inspection signal to the control terminal, it is regarded the executive terminal is in working order.

Beneficial Effects

The real-time current of each adjacent executive terminal is compared, when there is difference among them, the fault points can be locked in accurately or isolated and immediate ground alarm or short-circuit trip alarm signal is sent to control terminal, so that the power management staff do not need to run around in a hostile environment to find the fault points, and the trouble that frequent trip of several high-voltage switchgears in series in ring line is eliminated when the short-circuit failure occurs. The power transfer implemented by the interconnection switchgear in the ring line from another power supply to the other normal regions in a short time can greatly reduce the area and duration of power outage, and achieve a high degree of intelligent control.

DETAIL DESCRIPTION OF THE INVENTION

Figure 1:
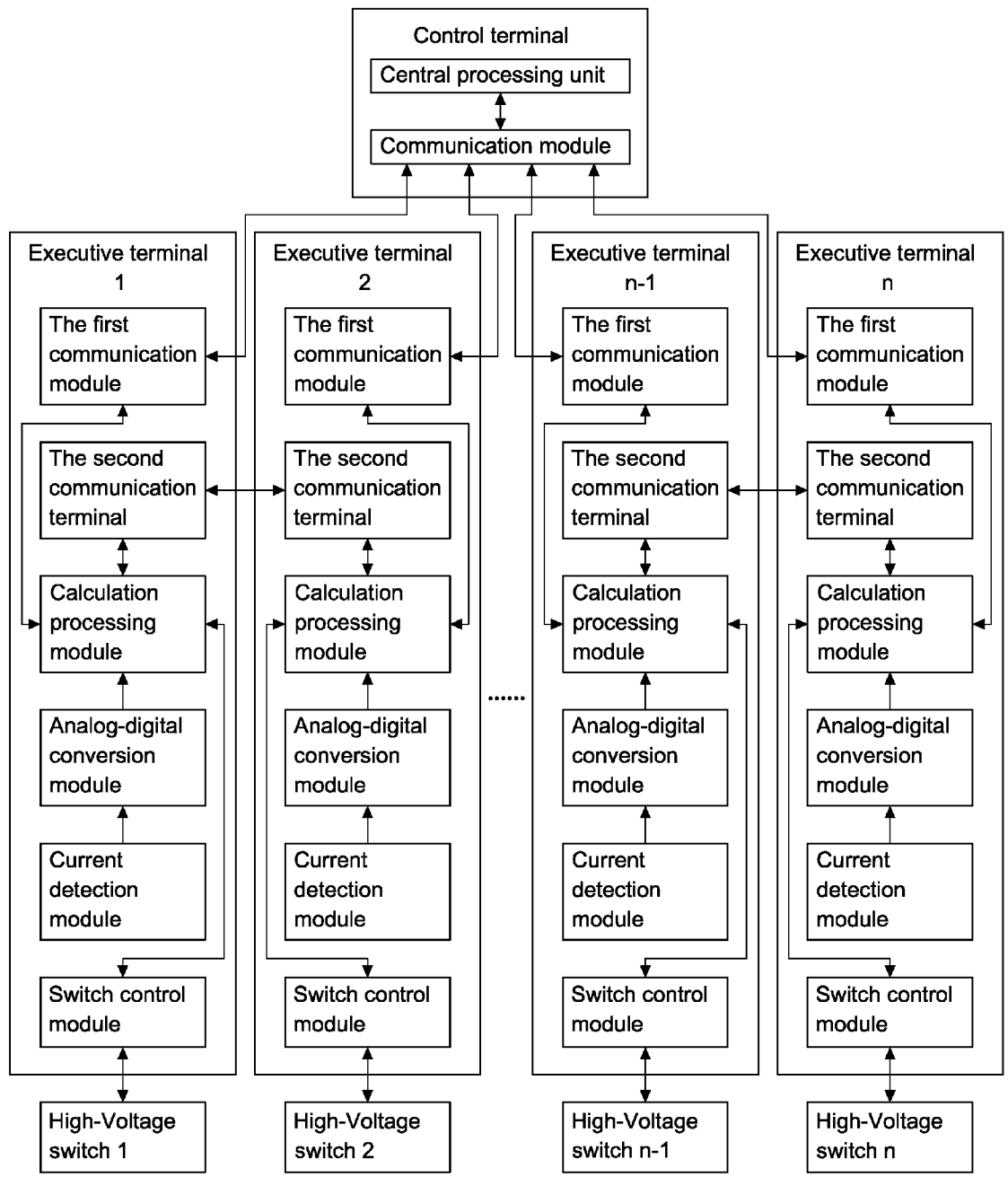
FIG. 1 is Schematic Structure of the invention.
Figure 3:
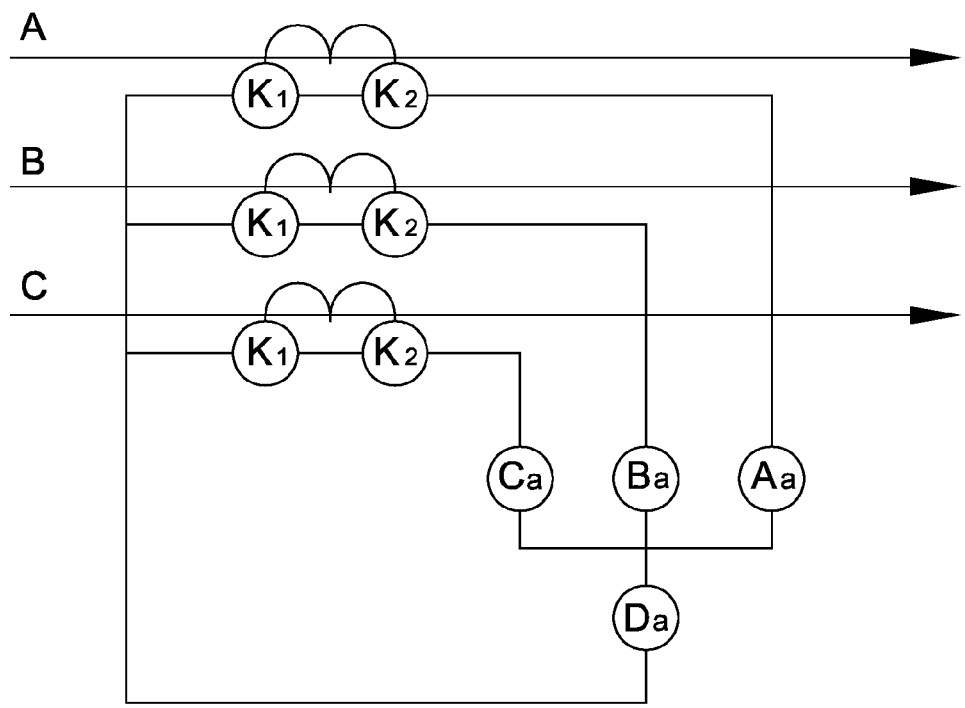
FIG. 3 is Schematic Structure of Current Detection Module.

The following description gives further detailed instruction of the technical program of the invention with combination of figures:

As shown in FIG. 1, the said executive terminals involved in the invention include current detection module, analog-digital conversion module, the second communication module and calculation processing module, the first communication module and the real-time switch control module; the current detection module is used for detecting the circuit current value; the analog-digital conversion module is set between current detection module and calculation module, which is used for analog-digital conversion; the second communication module is used for communication between adjacent executive terminals; calculation processing module is used for real-time comparison of current values obtained at adjacent executive terminals, when there is difference between them, the module will alarm to control terminal and/or give order of high-voltage switchgear trip; the first communication module is used for communication between executive terminal and control terminal. Furthermore, the second communication module is set with HF radio auto transceiver which is used for wireless connection between adjacent executive terminals;

Schematic structure of current detection module is shown as FIG. 3. Current detection module includes phase current detection unit and zero sequence current detection unit, and K1 and K2 in the figure are secondary leads of current transformer, Aa, Ba and Ca are three-phase current detection terminals, and Oa is zero sequence current detection terminal; current detection module includes phase current detection unit and zero sequence current detection unit: the former is set with three current transformers, which has three-phase current detection terminal Aa, Ba and Ca connected with calculation processing module through analog-digital conversion module; three current transformers in parallel is in series with one zero sequence current transformer, which composes the zero sequence current detection unit, and information at the detection terminal Oa is sent to the calculation processing module through analog-digital conversion module.

Figure 2:
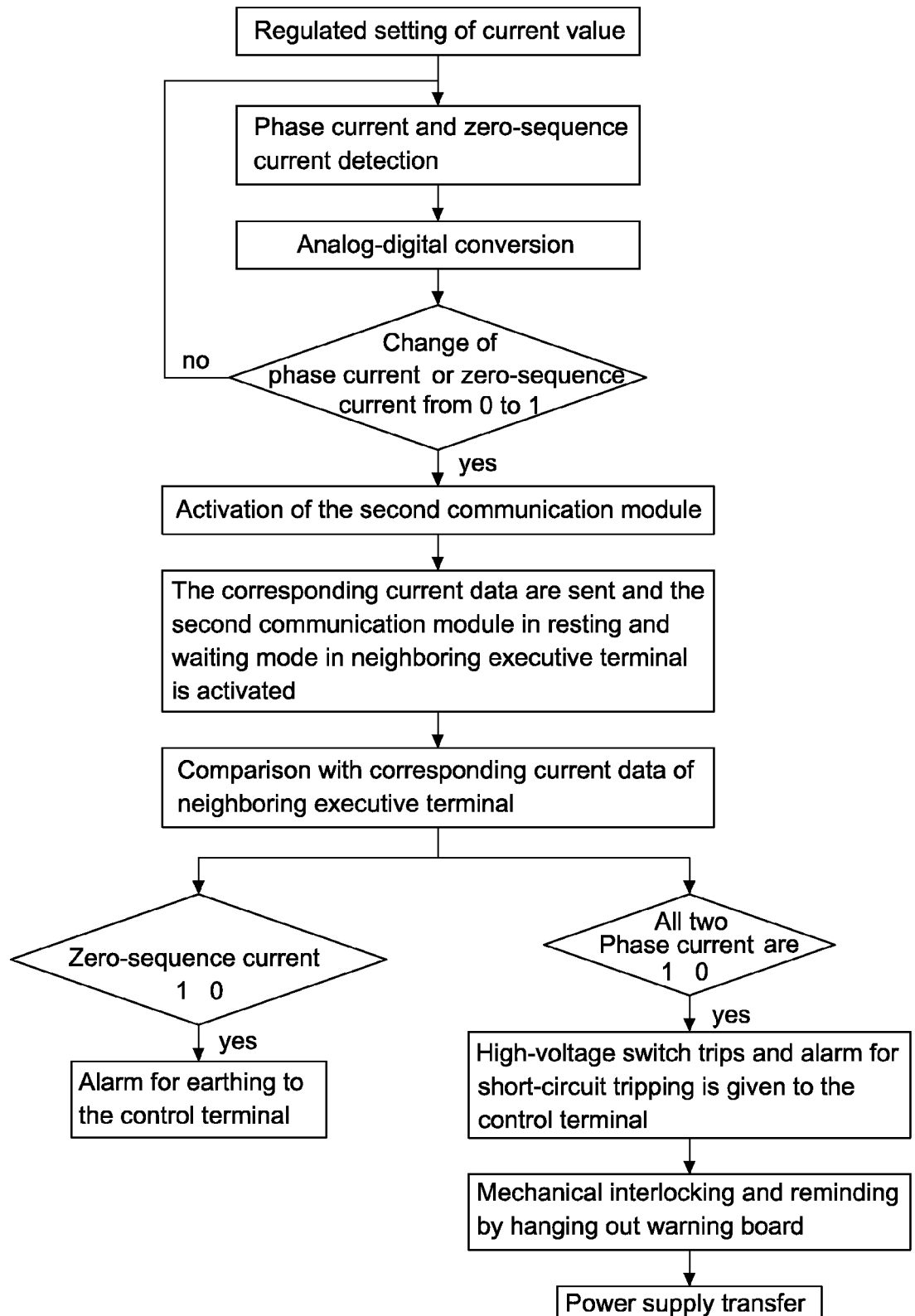
FIG. 2 is Work Flow Chart of the invention.

Working process of intelligent control system is shown as FIG. 2:

1) Default Setting Steps:

① Set the executive terminal to data "0", indicating no zero sequence current at that time; set to data "1" indicating there is zero sequence current produced;

② Work out the limit value of the maximum load current at executive terminal (generally about 1.3 times of rated current), set the current data equal to and under the limit value as "0", indicating the load current is normal; set the current data greater than the limit value as "1", indicating short-circuit current is produced;

2) Detection Procedures

Detection module of each executive terminal is set with three current transformers and one zero sequence transformer to detect the real-time current information of the circuit;

3) Analog-digital conversion step: the current value detected is connected with the calculation processing module through a analog-digital conversion module;

4) Judging step: the calculation processing module judges the current value, and the second communication module dormant will be activated if the current value is changed from 0 to 1;

5) Data sending step: the current data signal is sent to the adjacent executive terminal through the second communication module that is activated, and at the same time, activates the second communication module dormant in the adjacent executive terminal;

6) Calculation processing step: the calculation processing module compares the current value of the present executive terminal with that sent from the adjacent executive terminal: if there is difference between zero currents, immediate ground alarm will be sent to control terminal at the same time; when there is difference between the corresponding two phase currents, immediate trip of high-voltage switchgears at the same time will be implemented and a short-circuit trip alarm will be sent to control terminal at once.

Principles for Processing are:

A. Ground Fault

When ground fault occurs, each executive terminal before the fault point produces real-time zero sequence current, and each executive terminal after the fault point has no zero sequence current, so there is difference between them and it is easy to fix the fault point with comparison;

① When the data ratio of real-time zero sequence current before and after every two adjacent executive terminal is "1:0", it means there is difference and according to the setting, the two executive terminal shall immediately sent ground alarm to the control terminal at the same time, which means the ground fault just occurs between the two executive terminals;

② If an executive terminal has many series circuits behind, namely there are many executive terminals in adjacent behind, compare the former real-time zero sequence current with the later current sum, if the ratio is "1:0", the former executive terminal and those adjacent behind shall send ground alarm immediately to control terminal at the same time, which means the ground fault just occurs among the said executive terminals;

③ If the executive terminal is at the end of circuit or there is only disconnected switchgear behind the said terminal, compare the real-time zero sequence current data with data "0", when the ratio is "1:0", the executive terminal shall immediately send ground fault to the control terminal, which means the ground fault just occurs after the executive terminal;

B. Short-Circuit Fault

Each executive terminal before the fault point produces short-circuit-current, and all data are "1". Each executive terminal after the fault point receives only load current, and all data are "0"; only the real-time phase current of the executive terminal before the fault point is data "1", meaning the is fault current, while the real-time phase current data of the executive terminal after the fault point is "0", meaning there is no fault current, so they are different from each other;

① If the real-time two-phase phase current data of two adjacent executive terminals is in ratio "1:0", namely the former comparing with the later, according to the setting, such adjacent executive terminal shall trip at the same time within 150 millisecond, and immediately send short-circuit trip alarm to control terminal, which means the short-circuit fault just occurs between the two executive terminals;

② If an executive terminal has many series circuits behind, namely there are many executive terminals in adjacent behind, compare the former real-time two-phase phase current data with the later current sum at the same phase, if the ratio is "1:0", the former executive terminal and those adjacent behind shall trip at the same time within 150 millisecond, and immediately send short-circuit trip alarm to control terminal, which means the short-circuit fault just occurs among these executive terminals;

③ When only opened interconnection switches are arranged at the end of the executive terminal's circuit or behind the executive terminal, the real-time phase currents of two phases are compared with data "0". In the case of difference in ratio "1:0", the executive terminal will trip in 150 millisecond and immediately give an alarm for short-circuit and tripping to control terminal to indicate that the short fault appears behind the executive terminal.

7) Reminding procedures: After tripping of the executive terminal at the short fault point, the control terminal automatically enters into "interlocking and hanging out" procedure to allow the tripped executive terminal immediately and automatically to perform mechanical interlocking and hang out "NO SWITCHINGIN" warning board so that safety of personnel for first-aid repair of fault can be reliably guaranteed.

8) Procedure for power supply transfer: following automatic isolation of short fault point, the control terminal, based on the criterion that interlocking shall be performed and "NO SWITCHIN" warning board shall be hung out in the case of simultaneous short-circuit tripping of two or more neighboring executive terminals for an instant or sudden power failure at one side of interconnection switch of loop circuit, shall immediately command, via signal transmission of communication network, the interconnection switch to close so as to achieve power supply transfer from another power supply to other normal areas where power fails due to fault, therefore advanced self-healing ability of smart power network can be realized.

Where high-frequency wireless automatic transceiver is provided, the operating voltage of the second communication module is −48V and signal transmission distance is no shorter than 8 Km. Under proper conditions, the transceiver is in resting mode and its power consumption in resting and waiting mode is no higher than 0.5 W. Only under the circumstance that real-time current data changes from 0 to 1 or received current data of neighboring executive terminal is "1", the transceiver is activated to enter into operating mode and its power consumption in operating mode is no higher than 3 W.

Figure 4A:
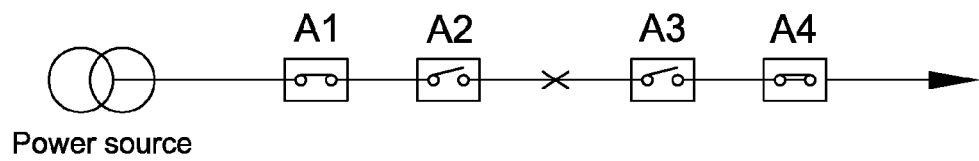
FIG. 4A is Alarm & Trip Diagram of Points of Failure in the middle.

Methods for implementing the invention are described in detail combining with specific fault as the following:

(1) As shown in FIG. 4A, earth current is generated at both A1 and A2 switches and zero-sequence current is generated in both secondary circuits. Both data of zero-sequence currents are "1" and no difference in phase comparison. No earth current is generated at both A3 and A4 switches and no zero-sequence current in both secondary circuits. The data are "0" and no difference in phase comparison. Zero-sequence current exists at A2 switch at the front of the fault point and no zero-sequence current is generated at A3 switch behind the fault point. The data ratio of zero-sequence current at A2 and A3 switches is "1:0" which is different. Based on settings, both A2 and A3 switches send earth alarm signal at the same time to control terminal to indicate that fault appears between these two switches.

According to FIG. 4A, high short circuit current whose data is "1" appears in two phases of both A1 and A2 switches and no difference is found after comparison. No high short circuit currents are generated at both A3 and A4 switches and the data ratio between them are "0" without difference. Meanwhile, high short circuit current appears only at A2 switch in the front of fault point and no high short circuit current exists at A3 switch behind the fault point. With difference, the data ratio of real-time phase current in two phases of A2 and A3 switches respectively is "1:0". On the basis of settings, A2 and A3 simultaneously trip within 150 milliseconds and immediately send alarming signal for short-circuit fault to control terminal. At the same time, interlocking is activated and "NO SWITCHIN" warning board is hung out to show that the fault appears between these two switches.

Figure 4B:
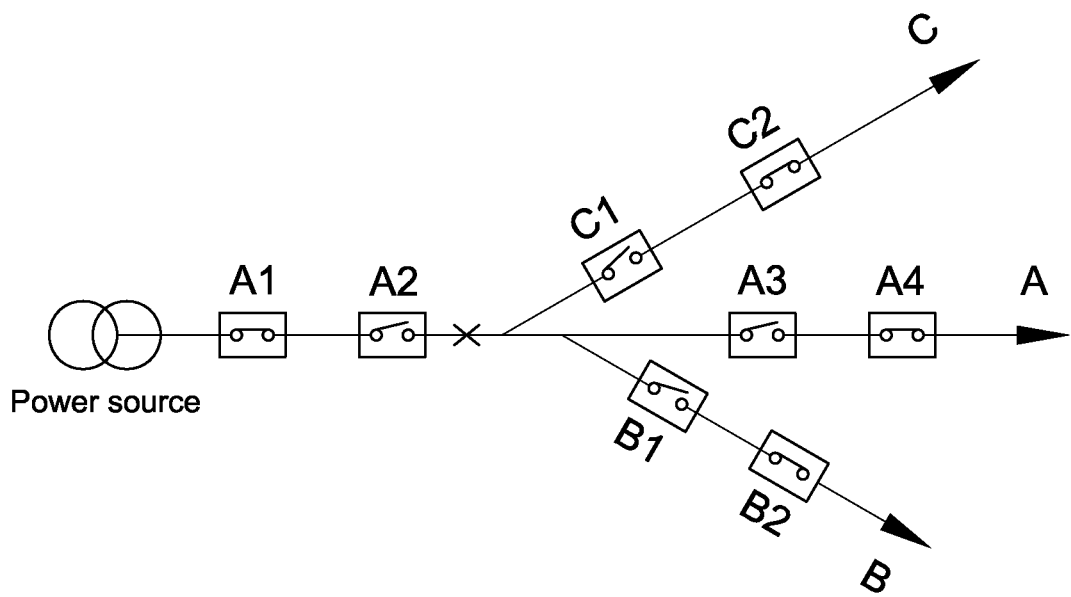
FIG. 4B is Alarm & Trip Diagram of Points of Failure among the multi-loop.

(2) As indicated in FIG. 4B: three branch circuits in series A, B and C are arranged behind the A2 switch viz. three neighboring switches B1, A3 and C1 are arranged behind A2 switch. When earth fault occurs at x point, earth current goes through A2 switch and zero-sequence current with data "1" is generated. A3 switch is located behind the fault point, meanwhile B1 and C1 are positioned behind the fault point and on the other branch circuit. No earth current and zero-sequence current whose data are "0" are generated at these three neighboring switches. By comparing the real-time zero-sequence current of A2 switch with the sum of real-time zero-sequence currents of three neighboring B1, A3 and C1, their data ratio to each other is "0" and different. According to settings, A2, B1, A3 and C1 switches immediately and simultaneously send warning signal for earthing to control terminal to show that fault occurs among these switches.

As shown in FIG. 4B, three branch circuits in series A, B and C are arranged behind A2 switch viz. three neighboring switches B1, A3 and C1 are provided behind A2 switch. When short-circuit fault appears at x point, high short-circuit current is generated at A2 switch. Data of real-time phase currents of both two phases are "1". A3 switch is positioned behind fault point, meanwhile B1 and C1 switches are arranged behind the fault point and on the other branch circuit. No high short-circuit current is generated at these three neighboring switches and real-time phase currents of three switches are "0". By comparing the real-time phase current of two phases of switch A2 with the sum of real-time phase currents of two phases of B1, A3 and C1 switches, all ratio values are "1:0". Four switches A2, B1, A3 and C1 will simultaneously trip with 150 milliseconds and immediately send warning signal for short-circuit tripping to control terminal to indicate that fault occurs among these several switches. At the same time, interlocking is performed and "NO SWITCHIN" warning board is hung out.

Figure 4C:
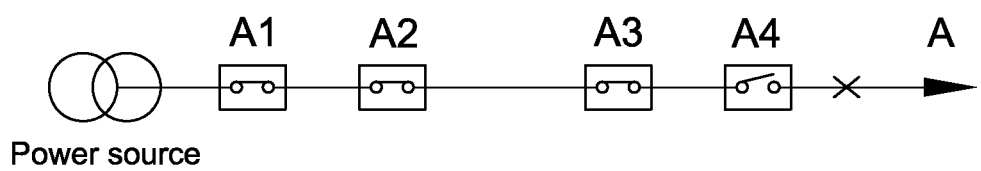
FIG. 4C is the Alarm & Trip Diagram of Points of Failure at the end.

(3) In accordance with FIG. 4C, earth currents and zero-sequence current appear at A1, A2, A3 and A4 switches when earth fault at x point appears at the end and all of their data are "1". No differences are found by comparisons among them. Because no switch is provided behind A4 switch, difference is found by comparing the data of zero-sequence current of A4 switch with "0" data. Based on settings, A4 switch immediately send warning signal for earthing to control terminal to show that fault occurs behind the A4 switch.

In accordance with FIG. 4C, high earth currents appear at A1, A2, A3 and A4 switches when earth fault at x point appears at the end and data of real-time phase currents of two shorted phases are "1". No differences are found between phases. Because no switch is provided behind A4 switch, difference is found by comparing the data of zero-sequence current of A4 switch with "0" data. Based on settings, A4 switch will trip in 150 milliseconds and immediately send warning signal for short-circuit tripping to control terminal. At the same time, interlocking is carried out and "NO SWITCHIN" warning board is hung out to indicate that fault appears just behind the A4 switch.

Figure 5:
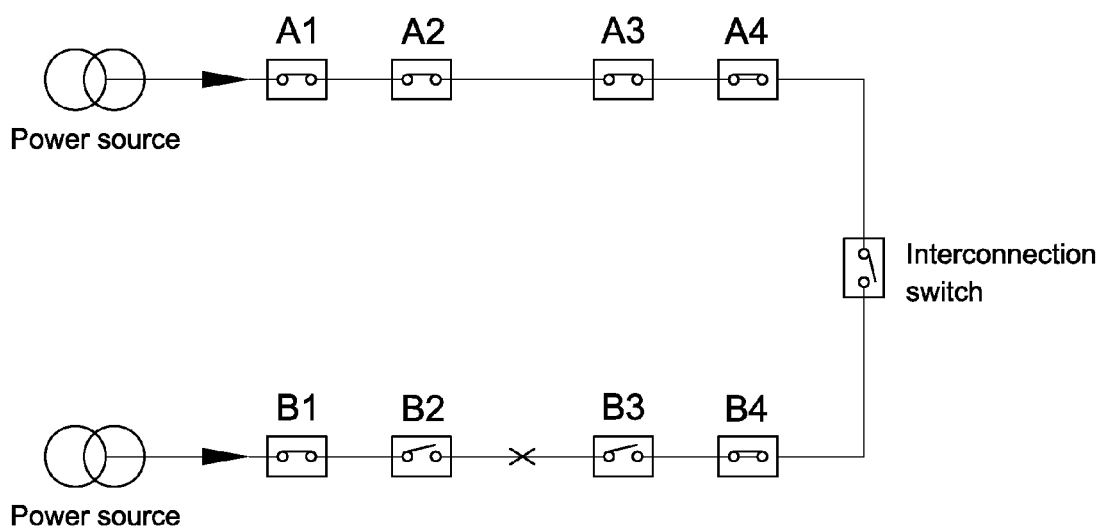
FIG. 5 is the Diagram of Fault Isolation & Transfer of Power.

(4) In accordance with FIG. 5, where fault point is located between B2 and B3 switches, high short-circuit current is generated in two phases of B2 switch and the data of B2's real-time phase current is "1", meanwhile no high short-circuit current appears at both B3 and B4 switches and the data of their real-time phase current is "0". Based on settings, B2 and B3 switches simultaneously trip within 150 milliseconds and immediately send warning signal for short-circuit tripping to control terminal, meanwhile, interlocking operation is performed and "NO SWITCHIN" warning board is hung out. After tripping of B2 and B3 switches, both ends of the fault point have been isolated and there is no power among B3, B4 switches and interconnection switch 1. Upon receiving the warning signal that B2 and B3 switches simultaneously trip, the control terminal command to perform interlocking operations and to hang "NO SWITCHIN" warning board. Moreover, after the information on sudden power failure at one side of interconnection switch 1 is received, the control terminal commands at once, based on setting, to disconnect the switchin of the interconnection switch 1 and to transfer power supply from A power supply to deenergized proper areas among interconnection switch 1, B4 and B3 switches, therefore advanced self-healing ability of smart power network can be realized.

What is claimed is:
1. An intelligent control system for high-voltage switch comprising:
a control terminal and a plurality of high-voltage switches operated by an executive terminal which is connected with the control terminal via a communication network;
said executive terminal comprising:
a current detection module for acquiring current values of circuits, which is consisted of a phase current detection unit and a zero-sequence detection unit,
an analog-digital conversion module for analog-digital conversion located between the current detection module and a calculation processing module, a second communication module for communications between neighboring terminals in case of failure, the calculation processing module for comparing current values obtained by neighboring executive terminals, in event of difference between obtained current values sending a warning signal to the control terminal or commanding to trip the plurality of high-voltage switches and to send warning signal to the control terminal, a first communication module for communicating the control terminal with the executive terminal, and a switch control module for real-time control on switches.

2. The intelligent control system for high-voltage switch of claim 1, wherein said second communication module is provided with a high-frequency wireless automatic transceiver which is employed for wireless communications between neighboring executive terminals.

3. The intelligent control system for high-voltage switch of claim 1, wherein said phase current detection unit is provided with three current transformers which are communicated with the calculation processing module by means of the analog-digital conversion module.

4. The intelligent control system for high-voltage switch of claim 3, wherein three current transformers in parallel and one zero-sequence current transformer are connected in series to make up of the zero-sequence current detection unit and the zero-sequence current transformer communicates with the calculation processing module via the analog-digital conversion module.

5. A high-voltage switch intelligent control method comprising following steps:
1) process detection procedure, during which a current detection module detects real-time current values;
2) process analog-digital conversion procedure, during which detected current values are communicated to the calculation processing module by means of an analog-digital conversion module;
3) Determination procedure during which current data are determined by the calculation processing module; if current value is larger than the preset value, the second communication module in resting and waiting mode is activated;
4) Data sending procedure during which current data signals are sent to the neighboring executive terminal via the activated second communication module and the second communication module in resting mode in neighboring executive terminal is activated;
5) calculation processing procedure during which the current data of the executive terminal are compared with those sent by the neighboring executive terminal; in the event that all the current data are larger or smaller than the preset value, it is considered that is allowable current data, otherwise, it is considered that unallowable current data is found, under the condition of unallowable current data, the neighboring executive terminal immediately and simultaneously sends warning signal to the control terminal or simultaneously command high-voltage switch to trip and give an alarm;

wherein the current detection includes zero-sequence current detection and phase current detection, in the case of difference in zero-sequence current by comparison, the corresponding executive terminal immediately and simultaneously gives an ground fault alarm to the control terminal, in the case of difference in two-phase current data detected by neighboring terminal, the corresponding executive terminal rapidly and simultaneously command high-voltage switch to trip and immediately gives an alarm for short-circuit tripping to the control terminal.

6. The high-voltage switch intelligent control method of claim 5, wherein mechanical interlocking operations are performed immediately and automatically and the "NO SWITCHIN" warning board is hung out subsequent to tripping of high-voltage switch at fault point.

7. The high-voltage switch intelligent control method of claim 6, wherein the control terminal is shorted and trip for interlocking and hangs out "NO SWITCHIN" warning board upon receiving the warning signal sent by the neighboring executive terminal; moreover, the control terminal commands the interconnection switch to close so as to transfer power supply from another power source to other normal areas which lose power due to failure in the case of sudden power failure at one side of interconnection switch of looped circuit.

8. The high-voltage switch intelligent control method of claim 7, wherein the control terminal periodically and automatically sends a polling signal to each executive terminal in order to check operating conditions of each executive terminal, furthermore, the control terminal can force the executive terminals which stop operations to be activated for self-restoration.

* * * * *